United States Patent
Kobata et al.

(10) Patent No.: US 10,986,243 B2
(45) Date of Patent: Apr. 20, 2021

(54) INFORMATION PROCESSING APPARATUS FOR REDUCING POWER CONSUMPTION BY SUPPLYING POWER TO A NECESSARY CONTROLLER OF MULTIPLE CONTROLLERS

(71) Applicant: FUJI XEROX CO., LTD., Tokyo (JP)

(72) Inventors: Masahiro Kobata, Kanagawa (JP); Kenji Imamura, Kanagawa (JP); Shinho Ikeda, Kanagawa (JP); Takanori Fukuoka, Kanagawa (JP); Tokuji Ueda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 187 days.

(21) Appl. No.: 16/053,956

(22) Filed: Aug. 3, 2018

(65) Prior Publication Data
US 2019/0058807 A1    Feb. 21, 2019

(30) Foreign Application Priority Data
Aug. 18, 2017 (JP) .............................. JP2017-157823

(51) Int. Cl.
*G06F 21/81* (2013.01)
*H04N 1/00* (2006.01)

(52) U.S. Cl.
CPC ..... *H04N 1/00904* (2013.01); *H04N 1/00896* (2013.01)

(58) Field of Classification Search
USPC ...... 358/1.1–3.29, 1.11–1.18, 413, 419–422, 358/498; 399/11, 19, 36–37, 88–90
See application file for complete search history.

(56) References Cited

U.S. PATENT DOCUMENTS

| | | | | |
|---|---|---|---|---|
| 2006/0285443 | A1* | 12/2006 | Vogt | G04B 19/223 368/21 |
| 2015/0227328 | A1* | 8/2015 | Yokoyama | H04N 1/00896 358/1.14 |
| 2017/0026532 | A1* | 1/2017 | Honda | H04N 1/00933 |
| 2017/0344095 | A1* | 11/2017 | Hashimoto | H04N 1/00933 |

FOREIGN PATENT DOCUMENTS

| | | |
|---|---|---|
| JP | 2002-351436 A | 12/2002 |
| JP | 2007-104701 A | 4/2007 |

* cited by examiner

*Primary Examiner* — Marcellus J Augustin
(74) *Attorney, Agent, or Firm* — Oliff PLC

(57) ABSTRACT

An information processing apparatus includes a first controller that performs a process dependent on hardware having a function, a second controller that performs a process independent of the hardware, and a power controller that, if there is a reason to resume supply of power to the second controller when supply of power to the first and second controllers has been restricted or stopped, activates both the first and second controllers or only the second controller depending on the reason.

16 Claims, 3 Drawing Sheets

INFORMATION PROCESSING APPARATUS FOR REDUCING POWER CONSUMPTION BY SUPPLYING POWER TO A NECESSARY CONTROLLER OF MULTIPLE CONTROLLERS

CROSS-REFERENCE TO RELATED APPLICATIONS

This application is based on and claims priority under 35 USC 119 from Japanese Patent Application No. 2017-157823 filed Aug. 18, 2017.

BACKGROUND

(i) Technical Field

The present invention relates to an information processing apparatus.

(ii) Related Art

An apparatus such as an image forming apparatus might include a system control device that controls a common part independent of hardware included in the image forming apparatus and a device control device that controls parts (parts unique to the hardware) dependent on the hardware included in the image forming apparatus.

SUMMARY

According to an aspect of the invention, there is provided an information processing apparatus including a first controller that performs a process dependent on hardware having a function, a second controller that performs a process independent of the hardware, and a power controller that, if there is a reason to resume supply of power to the second controller when supply of power to the first and second controllers has been restricted or stopped, activates both the first and second controllers or only the second controller depending on the reason.

BRIEF DESCRIPTION OF THE DRAWINGS

Exemplary embodiments of the present invention will be described in detail based on the following figures, wherein.

DETAILED DESCRIPTION

Figure 1:
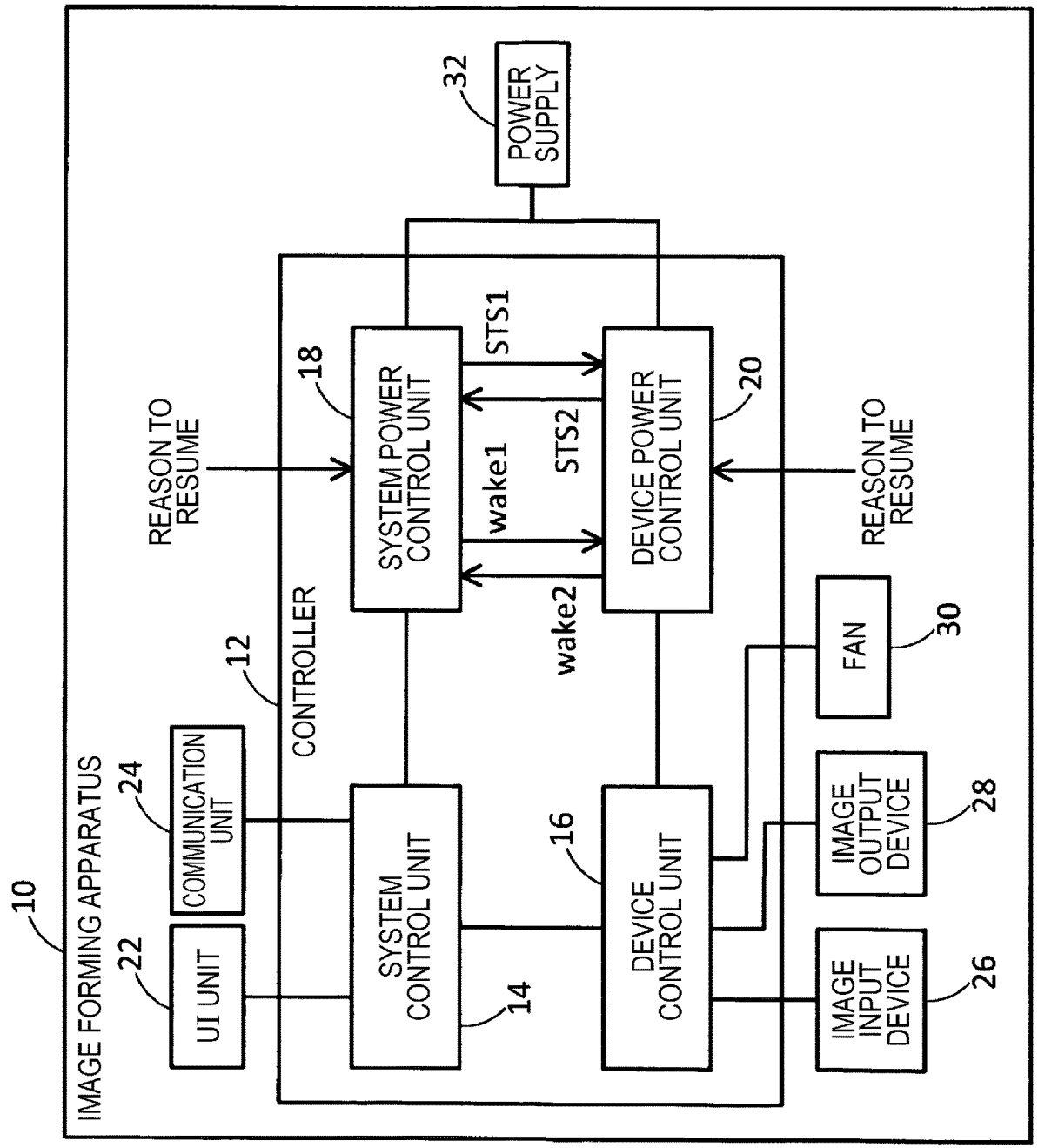
FIG. 1 is a block diagram illustrating an image forming apparatus according to an exemplary embodiment of the present invention.

An image forming apparatus as an example of an information processing apparatus according to an exemplary embodiment will be described with reference to FIG. 1. FIG. 1 illustrates an example of the image forming apparatus according to the present exemplary embodiment. The information processing apparatus according to the present exemplary embodiment is not limited to an image forming apparatus and may be, for example, a video recorder, an image playback apparatus (a moving image playback apparatus, a still image playback apparatus, etc.), a sound playback apparatus (a music player, etc.), or any other digital apparatus. In the following description, an image forming apparatus will be taken as an example of the information processing apparatus.

An image forming apparatus 10 has a function of forming an image. More specifically, the image forming apparatus 10 has at least one of a scanning function (image reading function), a printing function, a copying function, and a facsimile function. The image forming apparatus 10 may also have a function of communicating with another apparatus.

Components of the image forming apparatus 10 will be described hereinafter.

The image forming apparatus 10 includes one or plural pieces of hardware having a function and a controller 12 that controls the one or plural pieces of hardware.

The controller 12 includes a system control unit 14, a device control unit 16, a system power control unit 18, and a device power control unit 20. The system control unit 14 corresponds to an example of a second controller, and the device control unit 16 corresponds to an example of a first controller. The system power control unit 18 corresponds to an example of a second power controller, the device power control unit 20 corresponds to an example of a first power control unit, and a combination of the system power control unit 18 and the device power control unit 20 corresponds to an example of a power controller.

The system control unit 14 has a function of performing processes independent of the hardware included in the image forming apparatus 10, that is, a function of controlling a common part independent of types of hardware, individual differences in the hardware, differences between products, and the like. More specifically, for example, the system control unit 14 performs display and inputting for a user interface (UI) unit 22 as a piece of hardware, communication (e.g., communication with an external apparatus through a communication path such as a network) for a communication unit 24, processing of image data and apparatus information, image processing, and a process for authenticating a user, management of a memory (e.g., reading of a secure digital (SD) card, etc.). The system control unit 14 includes, for example, a processor such as a central processing unit (CPU) and a memory.

The device control unit 16 has a function of performing processes dependent on the hardware included in the image forming apparatus 10, that is, a function of controlling parts unique to the hardware. The device control unit 16 includes, for example, a circuit such as an application-specific integrated circuit (ASIC) and a memory. More specifically, for example, the device control unit 16 controls an image input device 26 such as a scanner, an image output device 28 such as a printer, a fan 30, post-processing devices such as a stapler, and, on the basis of information obtained by various sensors, a motor, a heater, a lamp, and the like. For example, the device control unit 16 individually controls supply of power to each piece of hardware using a register.

The system control unit 14 and the device control unit 16 are connected to each other by a bus (e.g., a high-speed bus such as Peripheral Component Interconnect (PCI) Express), for example, and communicate information such as various pieces of control data and image data with each other. Alternatively, the system control unit 14 and the device control unit 16 may be connected to each other by a dedicated line and communicate information for synchronizing with each other and the like.

The system power control unit 18 has a function of receiving power from a power supply 32 and controlling supply of power to the system control unit 14. If there is a reason to restrict or stop the supply of power to the system control unit 14, for example, the system power control unit 18 restricts or stops the supply of power to the system control unit 14. There is a reason to restrict or stop the supply of power to the system control unit 14, for example, when the hardware controlled by the system control unit 14 is not performing any process or not being operated, or when the hardware controlled by the system control unit 14 has not performed any process or has not been operated for a certain period of time. For example, there is a reason to restrict or stop the supply of power to the system control unit 14 when a user has not operated the UI unit 22 for the certain period of time or when the communication unit 24 has not performed communication for the certain period of time.

If there is a reason to resume the supply of power to the system control unit 14 after the supply of power to the system control unit 14 is restricted or stopped, the system power control unit 18 activates the system control unit 14 by supplying power to the system control unit 14. There is a reason to resume the supply of power to the system control unit 14, for example, when the user has operated the UI unit 22 or when the communication unit 24 has received an instruction to perform a process (e.g., a job such as a print job) or data. A job such as a print job corresponds to an example of a process.

When the system control unit 14 is activated, power is supplied to the components (the processor such as a CPU, the memory, etc.) of the system control unit 14. When the supply of power to the system control unit 14 is stopped, the supply of power to the components (the processor such as a CPU, the memory, etc.) of the system control unit 14 is stopped. When the supply of power is restricted, power smaller than when the system control unit 14 is activated is supplied to the system control unit 14. This case includes, for example, a state in which the CPU has clocked off, a state in which the supply of power to the CPU has been stopped, and a state in which the supply of power to the memory has been stopped. A so-called "sleep state" corresponds to an example of the state in which the supply of power is restricted.

The device power control unit 20 has a function of receiving power from the power supply 32 and controlling supply of power to the device control unit 16. If there is a reason to restrict or stop the supply of power to the device control unit 16, for example, the device power control unit 20 restricts or stops the supply of power to the device control unit 16. There is a reason to restrict or stop the supply of power to the device control unit 16, for example, when the hardware controlled by the device control unit 16 is not performing any process or not being operated, or when the hardware controlled by the device control unit 16 has not performed any process or has not been operated for a certain period of time. For example, there is a reason to restrict or stop the supply of power to the device control unit 16 when the hardware such as the image input device 26 or the image output unit 28 has not performed a process for a certain period of time.

If there is a reason to resume the supply of power to the device control unit 16 after the supply of power to the device control unit 16 is restricted or stopped, the device power control unit 20 activates the device control unit 16 by supplying power to the device control unit 16. There is a reason to resume the supply of power to the device control unit 16, for example, when an operation or a process for using the image input device 26, the image output unit 28, or the like has been performed. More specifically, there is a reason to resume the supply of power to the device control unit 16 when a document has been set in an automatic document feeder and detected, because the image input device 26 is expected to be used.

When the device control unit 16 is activated, power is supplied to the components (the circuit such as an ASIC, the memory, etc.) of the device control unit 16. When the supply of power to the device control unit 16 is stopped, the supply of power to the components (the circuit such as an ASIC, the memory, etc.) of the device control unit 16 is stopped. When the supply of power is restricted, power smaller than when the device control unit 16 is activated is supplied to the device control unit 16. This case includes, for example, a state in which the supply of power to the ASIC has been stopped and a state in which the supply of power to the memory has been stopped. A so-called "sleep state" corresponds to an example of the state in which the supply of power is restricted.

The system power control unit 18 and the device power control unit 20 communicate status information (signals STS1 and STS2 in FIG. 1) regarding the control units controlled thereby and activation signals (signals wake1 and wake2 in FIG. 1).

For example, the system power control unit 18 outputs, to the device power control unit 20, information (signal STS1) indicating a status (e.g., activated, power restricted, or power stopped) of the system control unit 14. The device power control unit 20 outputs, to the system power control unit 18, information (signal STS2) indicating a status (e.g., activated, power restricted, or power stopped) of the device control unit 16. In doing so, the system power control unit 18 identifies the status of the device control unit 16, and the device power control unit 20 identifies the status of the system control unit 14. The system power control unit 18 and the device power control unit 20 may transmit the status information at predetermined time intervals or upon receiving a request from each other.

The activation signal wake1 is output from the system power control unit 18 to the device power control unit 20 when, for example, the device control unit 16 needs to be activated. The activation signal wake2 is output from the device power control unit 20 to the system power control unit 18 when, for example, the system control unit 14 needs to be activated.

The hardware of the image forming apparatus 10 will be described hereinafter. The UI unit 22 includes a display section and an operation section. The display section is a display device such as a liquid crystal display. The operation section is, for example, an input device such as a touch panel or a keyboard. The UI unit 22 may be a user interface (e.g., an operation panel) that serves as both the display section and the operation section. The communication unit 24 is a communication interface and has a function of transmitting data to other apparatuses and a function of receiving data from other apparatuses through a communication path such as a network. The communication unit 24 may be a communication interface having a wireless communication function or may be a communication interface having a wired communication function. The image input device 26 is a scanner, for example, and reads a document to generate image data regarding the document. The image output unit 28 is a printer, for example, and receives image data or document data to form an image or a document on a recording medium such as a sheet. The fan 30 is a device for cooling the image forming apparatus 10. The image forming apparatus 10 also includes a storage device such as a hard disk or a memory. The storage device stores, for example, image data, various pieces of data (e.g., an instruction to perform a process such as a print job, control data, etc.), various programs, and the like. It is needless to say that the image forming apparatus 10 may include other kinds of hardware.

Figure 2:
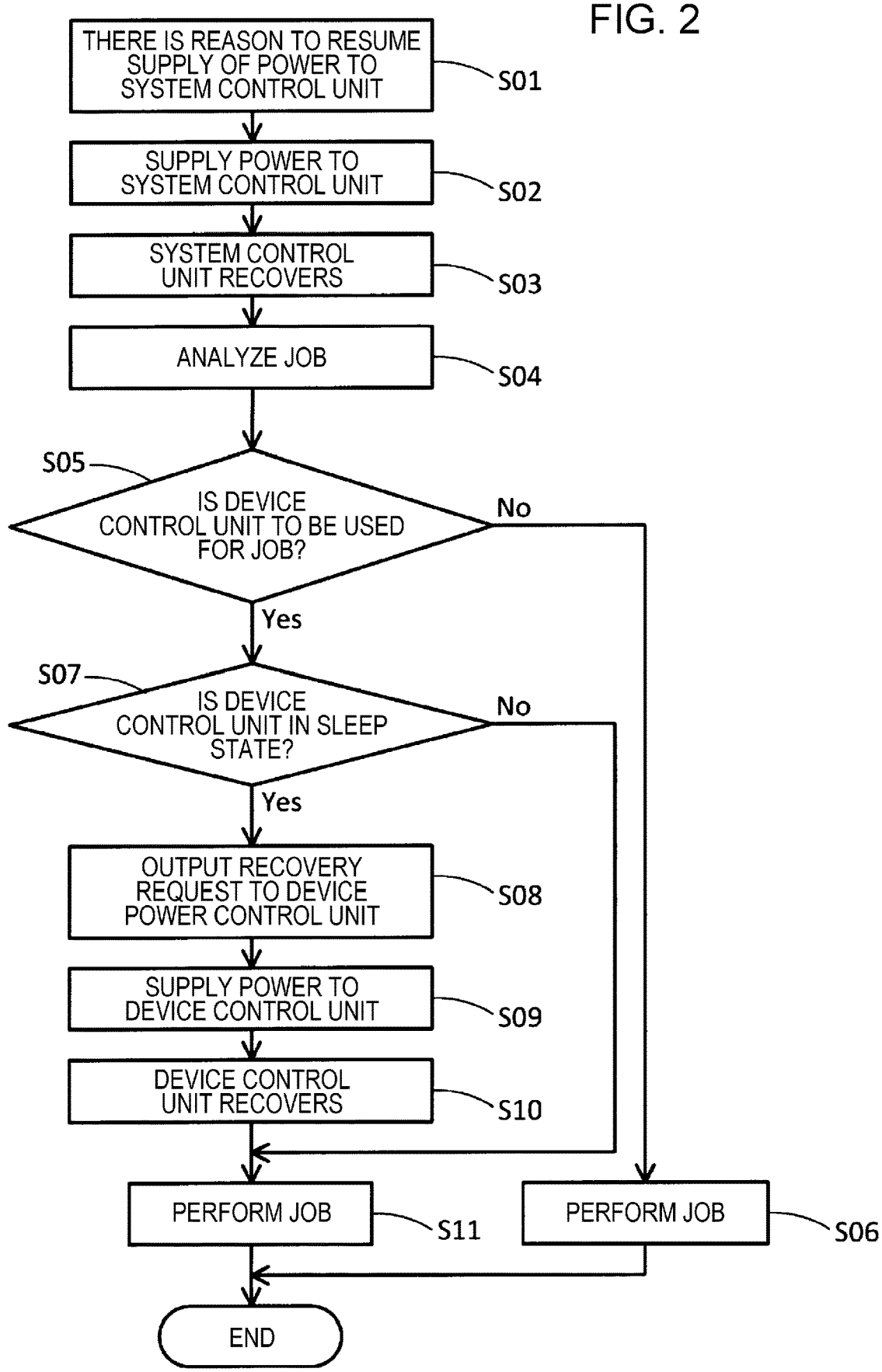
FIG. 2 is a flowchart illustrating an operation at a time when there is a reason to resume supply of power to a system control unit.

The operation of the image forming apparatus 10 when there is a reason to resume the supply of power to the system control unit 14 will be described hereinafter with reference to FIG. 2.

If there is a reason to resume the supply of power to the system control unit 14 when the supply of power to the system control unit 14 has been restricted or stopped (step S01), the system power control unit 18 supplies power from the power supply 32 to the system control unit 14 (step S02). As a result, the components of the system control unit 14 receive power, and the system control unit 14 activates (e.g., recovers from a sleep state) (step S03). If the communication unit 24 receives a job such as a print job through a communication path such as a network or the user issues an instruction to display a log (history information) using the UI unit 22, for example, there is a reason to resume the supply of power to the system control unit 14. The system power control unit 18, therefore, activates the system control unit 14.

Next, the system control unit 14 analyzes the job that is the reason to resume the supply of power to the system control unit 14 (step S04). The system power control unit 18 may conduct the analysis, instead.

If the device control unit 16 is not to be used for the job (NO in step S05), the system control unit 14 causes the hardware controlled thereby to perform the job (step S06). That is, if the hardware controlled by the device control unit 16 is not to be used for the job, that is, if the hardware controlled by the system control unit 14 alone is to be used for the job, the system control unit 14 causes the hardware controlled thereby to perform the job. If the supply of power to the device control unit 16 is restricted or stopped, the job is performed without activating the device control unit 16. When the job is an instruction to display a log, for example, only the hardware controlled by the system control unit 14 is to be used. The log, therefore, is displayed using the hardware. After the system control unit 14 finishes the job, the system power control unit 18 restricts or stops the supply of power to the system control unit 14. More specifically, the system power control unit 18 monitors the status of the system control unit 14 and, after the system control unit 14 finishes the process, restricts or stops the supply of power to the system control unit 14. As a result, after finishing the process assigned thereto, the system control unit 14 enters the sleep state. The process for displaying a log ends, for example, when the log has been displayed for a predetermined period of time or an instruction to hide the log has been issued. Upon detecting the end of the process, the system power control unit 18 restricts or stops the supply of power to the system control unit 14. In doing so, power consumption is reduced compared to when the system control unit 14 remains activated even after a process performed by the system control unit 14 ends.

If the device control unit 16 is to be used for the job (YES in step S05), on the other hand, the system power control unit 18 receives, from the system control unit 14, information indicating that the device control unit 16 is to be used for the job, and checks the status of the device control unit 16 on the basis of status information (signal STS2) regarding the device control unit 16 transmitted from the device power control unit 20.

If the status of the device control unit 16 is not the sleep state (NO in step S07), that is, if the device control unit 16 is activated, the device control unit 16 causes the hardware controlled thereby to perform a job assigned thereto, and the system control unit 14 causes the hardware controlled thereby to perform a job assigned thereto (step S11). If the job is a print job, for example, the device control unit 16 causes the image output unit 28 to perform the print job, and the system control unit 14 controls display relating to the print job.

If the status of the device control unit 16 is the sleep state (YES in step S07), that is, if the supply of power to the device control unit 16 has been restricted, the system power control unit 18 outputs the activation signal wave1, which is a request to recover the device control unit 16, to the device power control unit 20 (step S08). The system power control unit 18 outputs the activation signal wave1 to the device power control unit 20, too, when the supply of power to the device control unit 16 has been stopped.

Upon receiving the activation signal wave1, which is a recovery request, from the system power control unit 18, the device power control unit 20 supplies power from the power supply 32 to the device control unit 16 (step S09). As a result, power is supplied to the components of the device control unit 16, and the device control unit 16 activates (e.g., recovers from the sleep state) (step S10).

After the activation of the device control unit 16, the device control unit 16 causes the hardware controlled thereby to perform the job assigned thereto, and the system control unit 14 causes the hardware controlled thereby to perform the job assigned thereto (step S11).

As described above, if there is a reason to resume the supply of power to the system control unit 14 when the supply of power to the system control unit 14 and the device control unit 16 has been restricted or stopped, both the system control unit 14 and the device control unit 16 might be activated, or only the system control unit 14 might be activated, depending on the reason (job). If the device control unit 16 is not to be used for the job, the job is performed without activating the device control unit 16. Power consumption, therefore, is reduced compared to when the device control unit 16 is activated for no purpose. In addition, since the device control unit 16 is not activated unless necessary, the job is performed without taking time to activate the device control unit 16. Time taken to complete a job, therefore, becomes shorter than when the job is performed after the device control unit 16 is activated.

Figure 3:
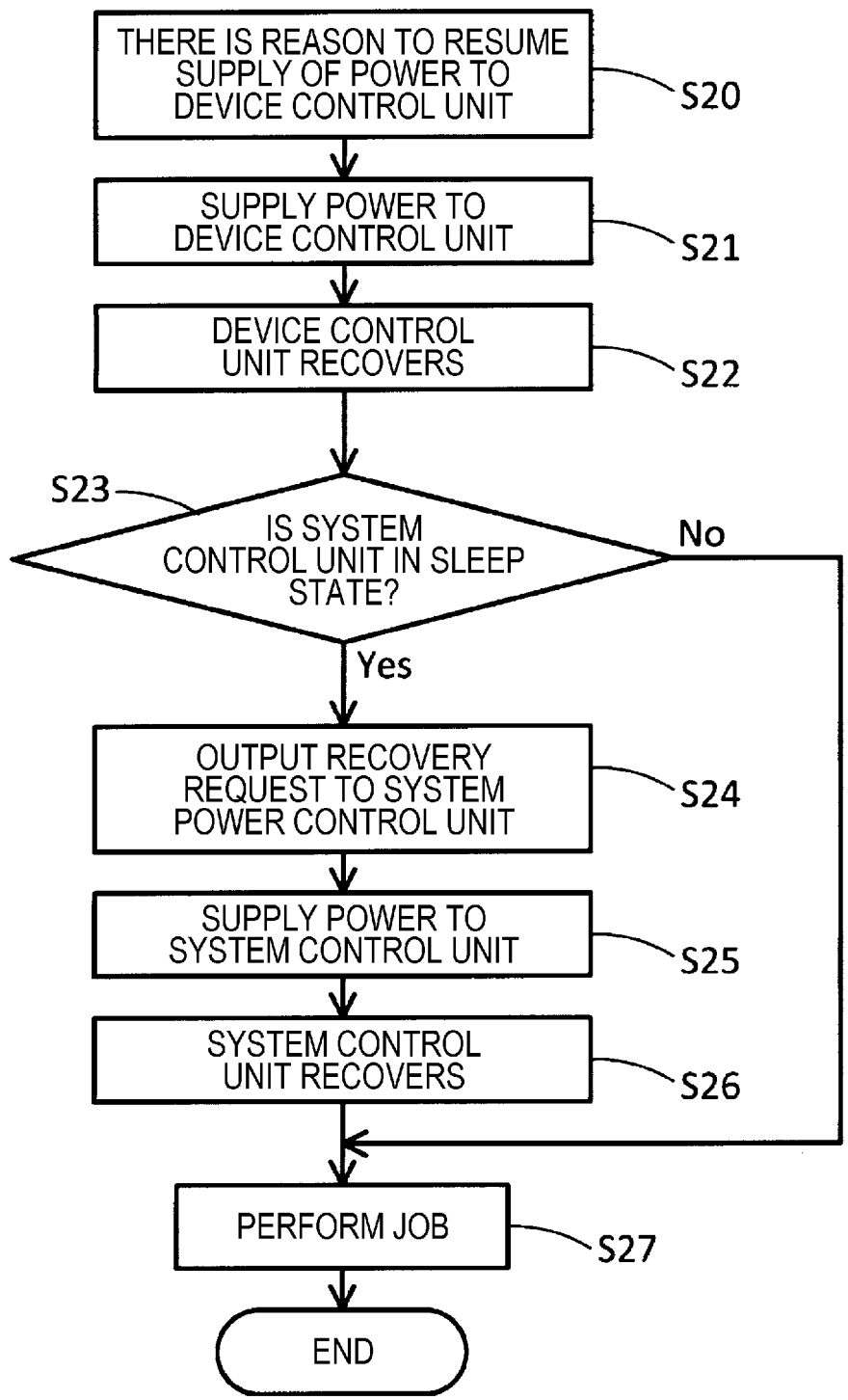
FIG. 3 is a flowchart illustrating an operation at a time when there is a reason to resume supply of power to a device control unit.

The operation of the image forming apparatus 10 when there is a reason to resume the supply of power to the device control unit 16 will be described hereinafter with reference to FIG. 3.

If there is a reason to resume the supply of power to the device control unit 16 when the supply of power to the device control unit 16 has been restricted or stopped (step S20), the device power control unit 20 supplies power from the power supply 32 to the device control unit 16 (step S21). As a result, the components of the device control unit 16 receive power, and the device control unit 16 activates (e.g., recovers from the sleep state) (step S22). If a document is set in the automatic document feeder and detected, for example, there is a reason to resume the supply of power to the device control unit 16. The device power control unit 20, therefore, activates the device control unit 16.

Next, the device power control unit 20 checks the status of the system control unit 14 on the basis of status information (signal STS1) regarding the system control unit 14 transmitted from the system power control unit 18.

If the status of the system control unit 14 is not the sleep state (NO in step S23), that is, if the system control unit 14 is activated, the device control unit 16 causes the hardware controlled thereby to perform a job assigned thereto, and the system control unit 14 cause the hardware controlled thereby to perform a job assigned thereto (step S27). If the job is an image reading job (scan job), the device control unit 16 causes the image input device 26 to perform the image reading job, and the system control unit 14 controls display relating to the image reading job.

If the status of the system control unit 14 is the sleep state (YES in step S23), that is, if the supply of power to the system control unit 14 is restricted, the device power control unit 20 outputs the activation signal wake2, which is a request to recover the system control unit 14, to the system power control unit 18 (step S24). The device power control unit 20 outputs the activation wake2 to the system power control unit 18, too, when the supply of power to the system control unit 14 is stopped.

Upon receiving the activation signal wave2, which is a recovery request, from the device power control unit 20, the system power control unit 18 supplies power from the power supply 32 to the system control unit 14 (step S25). As a result, power is supplied to the components of the system control unit 14, and the system control unit 14 activates (e.g., recovers from the sleep state) (step S26).

After the activation of the system control unit 14, the device control unit 16 causes the hardware controlled thereby to perform a job assigned thereto, and the system control unit 14 causes the hardware controlled thereby to perform a job assigned thereto (step S27).

As described above, if there is a reason to resume the supply of power to the device control unit 16 when the supply of power to the device control unit 16 has been restricted or stopped, the device control unit 16 is activated. If the supply of power to the system control unit 14 is also restricted or stopped, the system control unit 14 is also activated.

Step S23 need not be performed. In this case, the device power control unit 20 outputs the activation signal wake2, which is a recovery request, to the system power control unit 18 regardless of whether the system control unit 14 has been activated. Upon receiving the activation signal wake2, the system power control unit 18 keeps the system control unit 14 activated if the system control unit 14 has been activated. If the system control unit 14 has not been activated, the system power control unit 18 activates the system control unit 14. As a result, the same state as when step S23 has been performed is achieved.

The system control unit 14 and the device control unit 16 operate, for example, using power of several watts (W) to tens of watts (W). More specifically, the system control unit 14 and the device control unit 16 operate using power of 10 to 20 W. Since the system power control unit 18 controls the supply of power to the system control unit 14, power used to drive the system power control unit 18 is smaller than power used to drive the system control unit 14. Similarly, since the device power control unit 20 controls the supply of power to the device control unit 16, power used to drive the device power control unit 20 is smaller than power used to drive the device control unit 16. Power used to drive the system power control unit 18 and the device power control unit 20, for example, is several milliwatts. Even if the system power control unit 18 and the device power control unit 20 are provided in order to individually control the supply of power to the system control unit 14 and the device control unit 16, therefore, power to be used is only several milliwatts.

If, while the hardware controlled by the device control unit 16 is performing a job (process), the control performed by the system control unit 14 becomes unnecessary, that is, if the operation of the hardware controlled by the system control unit 14 becomes unnecessary, the system power control unit 18 may restrict or stop the supply of power to the system control unit 14. If the control performed by the system control unit 14 becomes unnecessary while the device control unit 16 is causing the image output unit 28 to perform a print job, for example, the system power control unit 18 restricts or stops the supply of power to the system control unit 14. In doing so, power consumption is reduced compared to when the system control unit 14 remains activated even after the control performed by the system control unit 14 becomes unnecessary.

If plural pieces of hardware are to be used to perform a job, the plural pieces of hardware may be individually activated at necessary timings. If the image input device 26 and the image output unit 28 are to be used in this order, for example, the device control unit 16 may activate the image input device 26 and the image output unit 28 in this order.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first controller that performs a process dependent on hardware having a function;
   a second controller that performs a process independent of the hardware; and
   a power controller that, if there is a reason to resume supply of power to the second controller when supply of power to the first and second controllers has been restricted or stopped, activates both the first and second controllers or only the second controller depending on the reason,
   wherein the power controller includes a first power controller that controls a power supply of the first controller and a second power controller that controls a power supply of the second controller, and
   wherein power used to drive the second power controller is smaller than power used to drive the second controller.

2. The information processing apparatus according to claim 1,
   wherein, if there is a reason to resume the supply of power to the first controller when the supply of power to the first and second controllers has been restricted or stopped, the power controller activates both the first and second controllers, and if there is a reason to resume the supply of power to the second controller, the power controller activates only the second controller without activating the first controller depending on the reason.

3. The information processing apparatus according to claim 2,
wherein the reason relates to a request to perform a process, and
wherein, if the second controller alone is to be activated for execution of the process, the power controller does not activate the first controller.

4. The information processing apparatus according to claim 3,
wherein, after the second controller finishes the process, the power controller restricts or stops the supply of power to the second controller.

5. The information processing apparatus according to claim 4,
wherein power used to drive the power controller is smaller than power used to drive the first and second controllers.

6. The information processing apparatus according to claim 3,
wherein power used to drive the power controller is smaller than power used to drive the first and second controllers.

7. The information processing apparatus according to claim 2,
wherein the reason relates to execution of a process, and
wherein, if the first and second controllers are activated due to the reason, the first controller controls the hardware in accordance with a request to perform the process and, if the control performed by the second controller becomes unnecessary while the hardware is performing the process, the power controller restricts or stops the supply of power to the second controller.

8. The information processing apparatus according to claim 7,
wherein power used to drive the power controller is smaller than power used to drive the first and second controllers.

9. The information processing apparatus according to claim 2,
wherein power used to drive the power controller is smaller than power used to drive the first and second controllers.

10. The information processing apparatus according to claim 1,
wherein the reason relates to a request to perform a process, and
wherein, if the second controller alone is to be activated for execution of the process, the power controller does not activate the first controller.

11. The information processing apparatus according to claim 10,
wherein, after the second controller finishes the process, the power controller restricts or stops the supply of power to the second controller.

12. The information processing apparatus according to claim 11,
wherein power used to drive the power controller is smaller than power used to drive the first and second controllers.

13. The information processing apparatus according to claim 10,
wherein power used to drive the power controller is smaller than power used to drive the first and second controllers.

14. The information processing apparatus according to claim 1,
wherein the reason relates to execution of a process, and
wherein, if the first and second controllers are activated due to the reason, the first controller controls the hardware in accordance with a request to perform the process and, if the control performed by the second controller becomes unnecessary while the hardware is performing the process, the power controller restricts or stops the supply of power to the second controller.

15. The information processing apparatus according to claim 14,
wherein power used to drive the power controller is smaller than power used to drive the first and second controllers.

16. The information processing apparatus according to claim 1,
wherein power used to drive the power controller is smaller than power used to drive the first and second controllers.

* * * * *